United States Patent [19]
Sadkowski

[11] Patent Number: 4,848,985
[45] Date of Patent: Jul. 18, 1989

[54] SEPARATION OF GAS MIXTURES

[75] Inventor: Piotr J. Sadkowski, Ash, United Kingdom

[73] Assignee: The BOC Group, plc, Windlesham, England

[21] Appl. No.: 219,683

[22] Filed: Jul. 15, 1988

[30] Foreign Application Priority Data

Jul. 30, 1987 [GB] United Kingdom ............... 8718129

[51] Int. Cl.[4] ............................................. B01D 53/04
[52] U.S. Cl. ........................................... 55/26; 55/75; 55/180; 55/389
[58] Field of Search .................. 55/26, 58, 75, 180, 55/389

[56] References Cited

U.S. PATENT DOCUMENTS 4,190,424  2/1980  Armond et al. .................. 55/58
4,386,945  6/1983  Mardner .......................... 55/26
4,715,867  12/1987  Vo ................................. 55/26

Primary Examiner—Charles Hart
Attorney, Agent, or Firm—Carol A. Nemetz; R. Hain Swope; L. R. Cassett

[57] ABSTRACT

A compressed gas mixture, particularly air, is separated in absorbent beds 6 and 8 in turn. The adsorbent adsorbs a first component in preference to, or more rapidly than, second and third components. Accordingly, product gas rich in the second component is delivered to the pipeline 44. While one bed adsorbs the first component from compressed gas mixture, the other is regenerated by being placed in communication with the atmosphere through vent pipe 30. At the end of each adsorption step, the respective bed 6 or 8 is placed in communication with a bed 12 of adsorbent that adsorbs the second component more rapidly than, or in preference to, the first and third components, and the pressure between the two beds is equalized. The pressure between the beds 6 and 8 is then equalized. Unadsorbed gas comprising the first and third components is vented from bed 12 to the atmosphere and then the bed 12 is placed in communication with either bed 6 or bed 8 to cause the desired product, i.e. the second component to be desorbed from bed 12 and to enter the bed 6 to 8. The venting of the third component to the atmosphere reduces the content thereof the second component product.

8 Claims, 1 Drawing Sheet

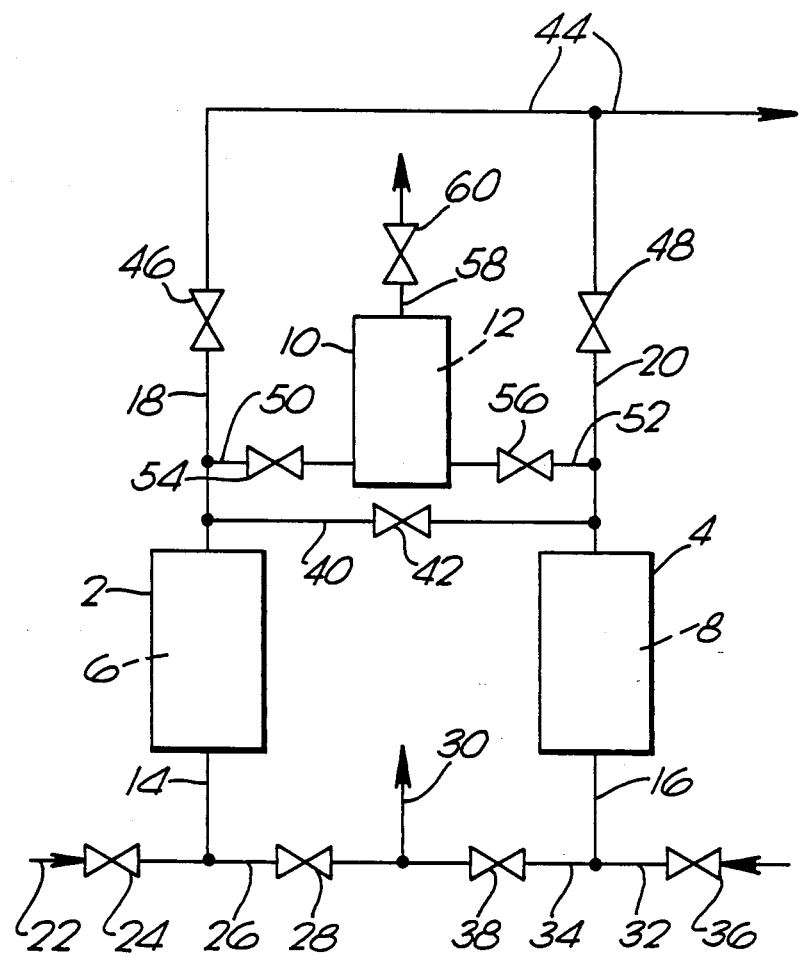

SEPARATION OF GAS MIXTURES

This invention relates to the separation of gas mixtures and particularly the separation of air by pressure swing adsorption "PSA").

BACKGROUND OF THE INVENTION

One known PSA process for the separation of oxygen from air employs a zeolite molecular sieve adsorbent which has the ability to adsorb nitrogen preferentially to oxygen and argon. In operation, a bed of this adsorbent is put through the following cycle: an adsorption step during which air is passed through the bed causing adsorption of most of the nitrogen and a portion of the argon and oxygen together with substantially all the carbon dioxide and water vapor, and production of an oxygen-rich product gas; a desorption step during which the bed outlet is closed, the bed is vented to atmospheric pressure through its inlet and is then evacuated through its inlet, so that the adsorbed gas are substantially removed, thereby regenerating it for the next adsorption step. In practice, two adsorbent beds are employed and operated on similar cycles but sequenced to be 180° out of phase so that one bed is undergoing adsorption while the other bed is undergoing desorption. One disadvantage of the known process is that there is a waste of the energy employed in compressing the incoming air by virtue of venting the bed to atmospheric pressure during its regeneration. Another feature of the known process, which may be disadvantageous when the oxygen-rich product gas is administered to a patient in conjunction with an anesthetic, is that the product gas is also enriched in argon.

It is also known to produce a nitrogen-rich product by pressure swing adsorption utilizing a carbon molecular sieve that adsorbs oxygen more rapidly than nitrogen or argon. An example of a commercially used process, of this type is described in UK patent specification No. 2 042 365B. In this process, at the end of each adsorption and each regeneration step, the two beds are placed in communication so as to equalize the pressure therebetween. It is thus possible to conserve a portion of the energy that had been used to compress the incoming air.

The present invention relates to a method and apparatus for separating a gas mixture comprising at least three components which employs a plurality of discrete bed pressure reduction steps prior to placing the bed in communication with the atmosphere so as to regenerate it while also helping to reduce the impurity level of single component product gas.

SUMMARY OF THE INVENTION

According to the present invention, there is provided a method of separating a gas mixture comprising at least three components by pressure swing adsorption employing first and second beds of an adsorbent that adsorbs a first component preferentially, to or more rapidly than, second and third components of the gas mixture and a third bed that adsorbs the second component more rapidly than or preferentially to the first and third components, the method comprising repeatedly performing a cycle of steps in which (a) the gas mixture is admitted under pressure to the first bed, and unadsorbed gas comprising the second component is withdrawn from the first bed as product;

(b) admission of the gas mixture to the first bed is ceased and the pressure in the first bed is reduced by placing it in sequential communication first with the third bed and then with the second bed so as to allow gas to flow out of the first bed;

(c) the first bed is regenerated by placing it in communication with the atmosphere so as to desorb and vent previously adsorbed gas;

(d) unadsorbed gas in the third bed is vented to the atmosphere, and then the third bed is placed in communication with one or both of the first and second beds so as to cause gas to be desorbed from the third bed and to flow to one or both of the first and second beds; and repeating steps (a) through (d) for the second bed, wherein the cycles for the two beds are phased so that they neither receive gas nor vent to the atmosphere simultaneously.

The invention also provides apparatus for performing the above method.

BRIEF DESCRIPTION OF THE DRAWING

The FIGURE is a schematic flow diagram of one apparatus for performing the method according to the invention.

DETAILED DESCRIPTION OF THE INVENTION

Referring to the drawing, the apparatus of the subject invention includes first and second cylindrical vessels 2 and 4 that are substantially identical and which contain first and second beds 6 and 8 of a suitable adsorbent.

There is a third cylindrical vessel 10, smaller than the vessels 2 and 4 which contains a bed of adsorbent 12 which is different from that in beds 6 and 8. The vessel 2 has a gas inlet 14 at its bottom and a gas pipe 18 extending out of its top. Similarly, the vessel 4 has a gas inlet 16 at its bottom and a gas pipe 20 extending out of its top. The inlet 14 terminates in the union of an air inlet line 22 (having an automatically operable on-off valve, i.e. a stop valve, 24 disposed therein) with a gas vent conduit 26 (having an automatically operable on-off valve 28 disposed therein) which terminates in an outlet 30 communicating with the atmosphere. The inlet 16 to the vessel 4 terminates in the union of an air inlet pipe 32 with a vent pipe 34.

The air inlet pipe 32 has an automatically operable on-off valve 36 disposed therein and the vent conduit 34 has an automatically operable on-off valve 38 disposed therein. The conduit 34 terminates in the vent pipe 30. Although not shown, both the air inlets 22 and 32 communicate at their upstream ends with a source of compressed air. In a hospital, therefore, the pipes 22 and 32 may be placed in communication with the normal compressed, dried, air supply. In such situations where there is an available supply of compressed air, the apparatus shown in the drawing need not be provided with its own dedicated compressor, and since regeneration of the beds may be effected merely by placing the beds in communication with the ambient atmosphere, no moving parts are required other than the on-off valves.

A pressure equalization conduit 40 having an automatically operable valve 42 disposed therein extends from the gas pipe 18 to the gas pipe 20 and thus, when open, permits gas to flow from the bed 6 to the bed 8 or vice versa according to which of the beds 6 and 8 is at the higher pressure. The gas pipes 18 and 20 lead to a product outlet line 44 and have automatically operable on-off valves 46 and 48, respectively, disposed therein.

The vessel 10 has a first conduit 50 communicating with a region of the pipe 18 intermediate the valve 46 and the union of the pipe 18 and the conduit 40. The vessel 10 has a second conduit 52 near its bottom communicating with the pipe 20 at a region intermediate the valve 48 and the union of the pipe 20 with the conduit 40. The conduits 50 and 52 have automatically operable on-off valves 54 and 56, respectively, disposed therein. The vessel 10 has at its top a vent pipe 58 communicating with the atmosphere and having an automatic operable on-off 60 valve disposed therein.

In operation, the apparatus shown in the drawing is operated to perform the cycle set out in Table 1. During the twelve steps of the cycle, the on-off valves of the apparatus shown in the drawing are in the positions indicated in Table 2.

TABLE 1

| STEP | BED 6 | BED 8 | BED 12 |
|---|---|---|---|
| 1 | Compressed air feed | Vent to atmosphere/ Receive purge gas from bed 12 | Supply purge gas to bed 8 |
| 2 | Equalize pressure | Vent to atmosphere with bed 12 | Equalize pressure with bed 12 |
| 3 | Equalize pressure with bed 8 | Equalize pressure with bed 6 | — |
| 4 | — | — | Vent to atmosphere |
| 5 | Vent to atmosphere | Equalize pressure with bed 12 | Equalize pressure with bed 8 |
| 6 | Vent to atmosphere | Compressed air feed | — |
| 7 | Vent to atmosphere/ Receive purge gas from bed 12 | Compressed air feed | Supply purge gas to bed 6 |
| 8 | Vent to atmosphere | Equalize pressure with bed 12 | Equalize pressure with bed 8 |
| 9 | Equalize pressure with bed 8 | Equalize pressure with bed 6 | — |
| 10 | — | — | Vent to atmosphere |
| 11 | Equalize pressure with bed 12 | Vent to atmosphere | Equalize pressure with bed 6 |
| 12 | Compressed air feed | Vent to atmosphere | — |

TABLE 2

| STEP | VALVE | | | | | | | | | |
|---|---|---|---|---|---|---|---|---|---|---|
| | 24 | 28 | 36 | 38 | 42 | 46 | 48 | 54 | 56 | 60 |
| 1 | O | S | S | O | S | O | S | S | O | S |
| 2 | S | S | S | O | S | S | S | O | S | S |
| 3 | S | S | S | S | O | S | S | S | S | S |
| 4 | S | S | S | S | S | S | S | S | S | O |
| 5 | S | O | S | S | S | S | S | S | O | S |
| 6 | S | O | O | S | S | S | O | S | S | S |
| 7 | S | O | O | S | S | S | O | O | S | S |
| 8 | S | O | S | S | S | S | S | S | O | S |
| 9 | S | S | S | S | O | S | S | S | S | S |
| 10 | S | S | S | S | S | S | S | S | S | O |
| 11 | S | S | S | O | S | S | S | O | S | S |
| 12 | O | S | S | O | S | O | S | S | S | S |

S = Shut
O = Open

The method according to the invention may typically be used to separate oxygen from air. In the production of oxygen from air, the first component is nitrogen, the second component is oxygen, the third component is argon and the third bed minimizes the argon-enrichment of the product gas.

In the separation of air, the adsorbent in the first and second beds is preferably a zeolite molecular sieve that adsorbs nitrogen in preference to argon and oxygen and the adsorbent in the third bed is preferably a carbon molecular sieve that adsorbs oxygen more rapidly than either nitrogen or argon.

In the compressed air feed steps of the cycle, dried air is fed to the apparatus shown in the drawing at a pressure of from about 2 to 10, preferably about 6, atmospheres. The zeolite molecular sieve in beds 6 and 8 is effective to adsorb carbon dioxide and nitrogen preferentially to argon and oxygen. The carbon dioxide is more readily adsorbed and therefore tends to be adsorbed predominantly in the bottom half of the bed. During each compressed air feed step (steps 1 and 2 for bed 6 and steps 6 and 7 for bed 8) unadsorbed gas comprising oxygen-enriched air passes out of the zeolite, bed into the product pipeline 44. During the compressed air feed (steps 2 and 8, respectively), the gas from the zeolite bed 6 or 8, flows into bed 12 which contains carbon molecular sieve. This step is intended to have a very short duration (typically less than one second) so that the gas flow into the bed of carbon molecular sieve 12 is predominantly of unadsorbed gas from the interspaces of the zeolite bed (6 or 8) at the start or the pressure equalisation step. The gas entering the bed 12 thus comprises a mixture of oxygen and argon with some nitrogen but substantially no carbon dioxide, the carbon dioxide having been retained on the zeolite adsorbent during the pressure equalization step. The oxygen is largely adsorbed in the bed 12 leaving nitrogen and argon as the void or unadsorbed gas. Subsequent venting of the unadsorbed gas to the atmosphere, a step which also takes less than one second (steps 4 and 10) leaves the contents of the bed 12 rich in oxygen but depleted in argon and nitrogen.

After flow of gas from beds 6 or 8 to the bed 12 (steps 2 and 8) the pressure between the beds 6 and 8 is equalized by allowing gas to flow from the higher pressure bed to the lower pressure bed (steps 3 and 9). Steps 3 and 9 may start at the same time as steps 4 and 10, respectively, or may be completed before steps 4 and 10 are performed. Each step of equalizing the pressure of the beds 6 and 8 with one another (steps 3 and 9) creates in those beds a pressure lower than that which obtains in the bed 12 after void or unadsorbed gas in bed 12 has been vented to the atmosphere (steps 4 and 10). Accordingly, there is then performed (steps 5 and 11) a third pressure equalization step in which gas, comprising relatively pure oxygen (having a reduced argon content), flows from the bed 12 into the one of the beds 6 and 8 whose pressure was increased in the preceding equalization step between them. Such third pressure equalization provides the receiving bed at its upper end with a charge of oxygen-enriched gas that is depleted in argon and thus enhances the purity of the oxygen product. The bed that receives this charge of oxygen from the bed 12 then receives the compressed air feed while the other bed is regenerated by being vented to atmosphere. Since in steps 5 and 11 the flow of gas from the bed 12 into the beds 6 and 8 does not reduce the pressure of bed 12 to atmospheric pressure. Bed 12 is used in steps 1 and 7 to provide an oxygen purge which again helps to reduce the level of impurities left in this bed at the end of venting it to the atmosphere.

If desired, the product pipeline 44 can be provided with a reservoir to enable product oxygen to be supplied to a user continuously. In addition, the product pipeline 44 may include a pressure regulator so as to prevent gas being withdrawn from the bed 6 and 8 at too low a pressure during the compressed air feed steps (steps 1, 6, 7 and 12).

Preferably, the step of placing the first bed at the end of its adsorption step in communication with the third bed is of sufficient duration to equalize the pressures therebetween. Similarly, it is preferred that each step of placing of the first and second beds in communication is of sufficient duration to equalize the pressures therebetween. By equalizing the pressure in these steps, it becomes possible to minimize the effective loss of work of compression of the incoming air.

Each venting of the third bed to the atmosphere preferably has a duration of less than one second. This time is sufficient for a significant amount of the unsorbed first and third components to be vented therefrom. Accordingly, when gas is returned from the third bed to the first or second bed (or both) it is relatively rich in the second component (the product) in comparison to the incoming gas mixture, but not significantly enriched in the third component. Accordingly, the return of gas from the third bed to the first and second beds helps to reduce the amount of impurity in the product.

Steps (a) (adsorption/production), (b) (equalization) and (c) regeneration) are performed in sequence. Typically, the venting part of step (d) is performed in a period intermediate ending communication between the first and third beds in step (b) and the beginning of step (c). While step (c) is being performed, typically, incoming gas mixture is admitted to the second bed and then the pressure in the second bed is reduced by placing it in communication with the third bed. Preferably, in step (d), the third bed communicates with the second bed immediately prior to admission of the incoming gas mixture to the second bed, and is subsequently placed in communication with the first bed undergoing regeneration. Both these measures enhance the purity of the product gas.

I claim:

1. A method of separating a gas mixture comprising at least three components by pressure swing adsorption utilizing first and second beds of adsorbent that adsorbs a first component preferentially to or more rapidly than second and third components of the gas mixture and a third bed that adsorbs the second component more rapidly than or preferentially to said first and third components, the method comprising repeatedly performing a cycle of steps in which:

(a) admitting said gas mixture under pressure to a first bed and withdrawing therefrom as product unadsorbed gas comprising the second component;
    (b) ceasing admission of the gas mixture to the first bed and reducing the pressure in the first bed by placing it in sequential communication with the third bed and then with the second bed so as to allow gas to flow out of the first bed;
    (c) regenerating the first bed by placing it in communication with the atmosphere so as to desorb and vent previously adsorbed gas;
    (d) venting unadsorbed gas in the third bed to the atmosphere and placing the third bed in communication with one or both of the first and second beds so as to cause gas to be desorbed from the third bed and to flow to one or both of the first and second beds; and
    (e) repeating steps (a) and (d) for the second bed, wherein the cycle for the first and second beds is phased such that they neither receive the gas mixture nor vent gas to the atmosphere simultaneously.

2. A method in accordance with claim 1, wherein venting of unadsorbed gas from the third bed in step (d) is performed intermediate the ending of communication between the first and third beds in step (b) and the beginning of step (c).

3. A method in accordance with claim 1, wherein said gas mixture is admitting to one of said first and second beds in step (a) while the other of said first and second beds is undergoing regeneration in step (c).

4. A method in accordance with claim 3, wherein in step (d), immediately prior to the admission of the gas mixture, the third bed is placed in communication with the bed that will receive said gas mixture, and is subsequently placed in communication with the bed undergoing regeneration.

5. A method in accordance with claim 1, wherein the third bed has a smaller volume than either of the first and second beds.

6. A method in accordance with claim 1, wherein the gas mixture is air, the first component is nitrogen, the second component is oxygen and the third component is argon.

7. A method in accordance with claim 6, wherein the adsorbent in the first and second beds is zeolite molecular sieve that adsorbs nitrogen in preference to oxygen and argon and adsorbent in the third bed is a carbon molecular sieve that adsorbs oxygen more rapidly than nitrogen and argon.

8. Apparatus for separating a gas mixture comprising first and second vessels containing, respectively, first and second beds of an adsorbent that adsorbs a first component of the gas mixture preferentially to or more rapidly than second and third components thereof; a third vessel containing a third bed of adsorbent that adsorbs the second component of said mixture more rapidly than or preferentially to the first and third components thereof; a product delivery pipeline for delivering product gas comprising said second component; a conduit affording communication when open between upper regions of the first and second beds; a conduit affording communication when open between an upper region of the first bed and a lower region of the third bed; a conduit affording communication when open between an upper region of the second bed and a lower region of the third bed; and a vent pipe affording communication when open between the top of the third bed and the atmosphere, each of said first and second beds having an inlet affording communication when open between the bottom of the respective bed and a source of said gas mixture, an outlet affording communication when open between the bottom of the respective bed and the atmosphere and an outlet affording communication when open between the top of the respective bed and the product delivery pipeline, and wherein the said inlets, outlets, conduits and the said pipeline each have a stop valve disposed therein.

* * * * *